United States Patent [19]
Yam et al.

[11] Patent Number: 5,512,071
[45] Date of Patent: Apr. 30, 1996

[54] WATER SOLUBLE BLAST MEDIA CONTAINING SURFACTANT

[75] Inventors: Benny S. Yam, Holmdel; Amy L. Joseph, Hopewell; Anthony E. Winston, East Brunswick, all of N.J.; Keith A. Jones, Yardley, Pa.

[73] Assignee: Church & Dwight Co., Inc., Princeton, N.J.

[21] Appl. No.: 202,066

[22] Filed: Feb. 25, 1994

Related U.S. Application Data

[62] Division of Ser. No. 6,658, Jan. 21, 1993, Pat. No. 5,316,587.

[51] Int. Cl.$^6$ .................................................. C09C 1/68
[52] U.S. Cl. ......................... 51/307; 134/7; 252/174.14; 252/174.21; 252/116; 451/36; 451/38; 451/39; 451/40; 51/308
[58] Field of Search ............................... 134/7; 51/317, 51/319, 320, 304, 306, 307, 308; 252/174.14, 174.21, 116; 451/36, 37, 38, 39, 40

[56] References Cited

U.S. PATENT DOCUMENTS

| | | | |
|---|---|---|---|
| 2,605,596 | 8/1952 | Uhri | 51/282 |
| 2,817,195 | 12/1957 | Curtin | 51/282 |
| 3,142,590 | 7/1964 | Hergonson | 134/7 |
| 3,607,161 | 9/1971 | Monick | 51/307 |
| 3,764,541 | 10/1973 | Kaneko | 252/89 |
| 4,125,969 | 11/1978 | Easton | 51/320 |
| 4,347,152 | 8/1982 | Wixon | 252/174 |
| 4,545,155 | 10/1985 | Nakata | 51/320 |
| 4,802,312 | 2/1989 | Glaeser et al. | 51/321 |
| 5,112,406 | 5/1992 | Lajoie et al. | 134/7 |
| 5,146,716 | 9/1992 | Lynn | 51/320 |
| 5,160,547 | 11/1992 | Kirschner et al. | 134/7 |
| 5,188,822 | 2/1993 | Viccaro et al. | 424/52 |
| 5,203,698 | 4/1993 | Blake et al. | 433/88 |
| 5,256,703 | 10/1993 | Hermann et al. | 521/120 |
| 5,308,403 | 5/1994 | Yam et al. | 134/7 |

FOREIGN PATENT DOCUMENTS 3906394  9/1990  Germany .

OTHER PUBLICATIONS

Advertisement—"Please Your Toughest Customer, Armex® Blast Media, Accustrip System™, ©1992", Church & Dwight Co., Ltd.

*Primary Examiner*—David L. Lacey
*Assistant Examiner*—Sean Vincent
*Attorney, Agent, or Firm*—Depaoli & Frenkel

[57] ABSTRACT

A blast media for stripping contaminants from a solid surface comprises water soluble abrasive particles and a surfactant which reduces the amount of water soluble residues of blast media remaining on the targeted surface and which enables any residues which remain to be readily removed by fresh water.

22 Claims, No Drawings

WATER SOLUBLE BLAST MEDIA CONTAINING SURFACTANT

This application is a division of application Ser. No. 08/006,658, filed Jan. 21, 1993, now U.S. Pat. No. 5,316,587.

FIELD OF THE INVENTION

The present invention relates to improvements in blast media utilized to remove adherent material such as paint, scale, dirt, grease and the like from solid surfaces. In particular, the present invention is directed to water soluble abrasive blast media which has incorporated therein a surfactant so that residues of the blast media remaining on the targeted surface can be minimized and readily removed.

DESCRIPTION OF THE PRIOR ART

In order to clean a solid surface so that such surface can again be coated such as, for example, to preserve metal against deterioration, remove graffiti from stone or simply to degrease or remove dirt from a solid surface, it has become common practice to use an abrasive blasting technique wherein abrasive particles are propelled by a high pressure fluid against the solid surface in order to dislodge previously applied coatings, scale, dirt, grease or other contaminants. Various abrasive blasting techniques have been utilized to remove coatings, grease and the like from solid surfaces. Thus, blasting techniques comprising dry blasting which involves directing the abrasive particles to a surface by means of pressurized air typically ranging from 30 to 150 psi, wet blasting in which the abrasive blast media is directed to the surface by a highly pressurized stream of water typically 3,000 psi and above, multi-step processes comprising dry or wet blasting and a mechanical technique such as sanding, chipping, etc. and a single step process in which both air and water are utilized either in combination at high pressures to propel the abrasive blast media to the surface as disclosed in U.S. Pat. No. 4,817,342, or in combination with relatively low pressure water used as a dust control agent or to control substrate damage have been used. Water for dust control has been mixed with the air either internally in the blast nozzle or at the targeted surface to be cleaned and such latter process, although primarily a dry blasting technique, is considered wet blasting inasmuch as media recovery and clean up is substantially different from that utilized in a purely dry blasting operation.

The blast media or abrasive particles most widely used for blasting surfaces to remove adherent material therefrom is sand. Sand is a hard abrasive which is very useful in removing adherent materials such as paint, scale and other materials from metal surfaces such as steel. While sand is a most useful abrasive for each type of blasting technique, there are disadvantages in using sand as a blast media. For one, sand, i.e., crystalline silica, is friable and upon hitting a metal surface will break into minute particles which are small enough to enter the lungs. These minute silica particles pose a substantial health hazard. Additionally, much effort is needed to remove the sand from the surrounding area after completion of blasting. Still another disadvantage is the hardness of sand itself. Thus, sand cannot readily be used as an abrasive to remove coatings from relatively soft metals such as aluminum or any other soft substrate such as plastic, plastic composite structures, concrete or wood, as such relatively soft substrates can be excessively damaged by the abrasiveness of sand. Moreover, sand cannot be used around moving parts of machinery inasmuch as the sand particles can enter bearing surfaces and the like.

An alternative to sand as a blast media, particularly, for removing adherent coatings from relatively soft substrates such as softer metals as aluminum, composite surfaces, plastics, concrete and the like is sodium bicarbonate. While sodium bicarbonate is softer than sand, it is sufficiently hard to remove coatings from aluminum surfaces and as well remove other coatings including paint, dirt, and grease from non-metallic surfaces without harming the substrate surface. Sodium bicarbonate is not harmful to the environment and is most advantageously water soluble such that the particles which remain subsequent to blasting can be simply washed away without yielding environmental harm. Since sodium bicarbonate is water soluble and is benign to the environment, this particular blast media has also found increasing use in removing coatings and in cleaning dirt, grease and oil and the like from harder surfaces as well including steel and interior surfaces such as those which contact food such as in environments of food processing or handling.

Sodium bicarbonate is also a friable abrasive and, like sand, will form a considerable amount of dust during the blast cleaning process. To control the dust formed by the sodium bicarbonate blast media as it contacts the targeted surface, water is included in the pressurized fluid carrier medium. Thus, water can be used as the carrier fluid or, more preferably, injected into a pressurized air stream which carries the blast media from the blast nozzle to the targeted surface. Water as a means to control dust has been mixed with the air stream internally in the blast nozzle or into the air stream externally of the nozzle. The addition of water to the pressurized air stream has been very effective in controlling dust formed by the sodium bicarbonate blast media. One disadvantageous result, however, of utilizing water to control the dust formed by the sodium bicarbonate blast media is that a residue of the water soluble sodium bicarbonate, flow aid or even calcium carbonate formed by reaction of water-hardness ions with the bicarbonate remains on the substrate surface. Even after rinsing the substrate with water, this residue can remain leaving an unsightly film on the cleaned surface.

Accordingly, it is the primary objective of the present invention to make improvements in water soluble blast media so as to reduce the residues of the media which remain on the targeted surface subsequent to blasting and to render any residue which remains readily removable.

Another object of the present invention is to provide an improved process for blast cleaning a targeted surface with a water soluble abrasive blast media which does not leave residue on the targeted surface.

SUMMARY OF THE INVENTION

The above objects of the present invention are achieved by incorporating with a water soluble blast media a small amount of a surfactant. The surfactant can be incorporated with the blast media either by mixing the surfactant with the solid particles of blast media or by incorporating the surfactant in the water stream which is utilized either as the carrier fluid for the blast media or added to a pressurized air stream for the purpose of dust control. The addition of the surfactant reduces the residues of the water soluble media which remain on the targeted surface and any residue which does remain can be easily removed by rinsing with fresh water. The surfactant appears to lower the surface tension of the water droplets containing dissolved media and attached to the substrate surface causing the droplets to be readily washed from the surface before the solubilized media can dry. The blast cleaning process is not adversely affected by the addition of the surfactant and, in fact, may enhance the cleaning efficiency of the blast media to strip contaminants from a substrate in view of the detergent action of the surfactant.

DETAILED DESCRIPTION OF THE INVENTION

The blast media to be utilized are water soluble and, typically will be in the form of a powder containing substantially singular abrasive particles have an average size range of from about 10 to 1,000 microns in diameter. Preferably, the blast media will comprise abrasive particles having an average size of from about 50–500 microns and wherein the amount of particles above 1,000 microns does not exceed about 1% of the total media. Water soluble blast media are advantageous since such blast media can be readily disposed of by a water stream, are readily separated from the insoluble paints and resins which have been stripped to facilitate waste disposal, and since most water soluble blast media are relatively soft, i.e., Mohs hardness less than 3.0, such media can be utilized to remove coatings, grease, dirt and the like from a variety of substrates including relatively soft metals such as aluminum as well as plastic, ceramic, concrete, wood and composites of such materials. Water soluble blast media having a Mohs hardness of less than 5.0 are generally useful in this invention, in particular, for cleaning softer substrates. Non-limiting examples of water soluble blast media which can be utilized include the alkali metal and alkaline earth metal salts such as the chlorides, chlorates, carbonates, bicarbonates, sulfates, silicates, the hydrates of the above, etc. The preferred blast media are the alkali metal salts and, in particular, the sodium and potassium carbonates, bicarbonates and sulfates. The most preferred blast media are the alkali metal bicarbonates as exemplified by sodium bicarbonate. Also preferably useful are sodium sesquicarbonate, natural sodium sesquicarbonate known as trona, sodium bicarbonate, sodium carbonate, potassium carbonate, potassium bicarbonate, sodium chloride and sodium sulfate which is described in commonly assigned U.S. Pat. No. 5,112,406. It is important to note that by water soluble is not meant completely water soluble as some salts and natural minerals such as trona may contain minor amounts of insoluble materials. For example, trona which is a natural sodium sesquicarbonate may contain up to 10 wt. % of insolubles. Thus, by water soluble is meant to include those materials which are substantially soluble in water and sufficiently soluble to leave a water soluble residue on a targeted surface.

To reduce residues of the blast media from remaining on the substrate surface, the blast media of the present invention has a surfactant incorporated therein. The surfactant which may be utilized can be anionic, nonionic or amphoteric in nature or mixtures of the various types of surfactant can be used.

Anionic surfactants appear to best reduce the residue formation of water soluble blast media components. Moreover, since most of the anionic surfactants are solids, such surfactants can be simply added as is to the blast media without adverse caking and agglomeration of blast media particles. Examples of suitable anionic surfactants are water-soluble salts of the higher alkyl sulfates, such as sodium lauryl sulfate or other suitable alkyl sulfates having 8 to 18 carbon atoms in the alkyl group, water-soluble salts of higher fatty acid monoglyceride monosulfates, such as the sodium salt of the monosulfated monoglyceride of hydrogenated coconut oil fatty acids, alkyl aryl sulfonates such as sodium dodecyl benzene sulfonate, higher alkyl sulfoacetates, higher fatty acid esters of 1,2-dihydroxy propane sulfonate, and the substantially saturated higher aliphatic acyl amides of lower aliphatic amino carboxylic acid compounds, such as those having 12 to 16 carbons in the fatty acid, alkyl or acyl radicals, and the like. Examples of the last mentioned amides are N-lauroyl sarcosinate, and the sodium, potassium, and ethanolamine salts of N-lauroyl, N-myristoyl, or N-palmitoyl sarcosinate sold by W. R. Grace under the tradename "Hamposyl". Also effective are polycarboxylated ethylene oxide condensates of fatty alcohols manufactured by Olin under the tradename of "Polytergent CS-1".

Amphoteric surfactants are a well known class of surfactants which includes the alkyl beta-iminodipropionates $RN(C_2H_4COOM)_2$ and the alkyl beta-aminopropionates $RNHCH_4COOM$ where the alkyl group R contains 8 to 18 carbon atoms in both formulae and M is a salt-forming cation such as the sodium ion. Further examples are the long chain imidazole derivatives, for example, the di-sodium salt of lauroyl-cycloimidinium-1-ethoxy-ethionic acid-2-ethionic acid, and the substituted betaines such as alkyl dimethyl ammonio acetates where the alkyl group contains 12 to 18 carbon atoms. N-alkyl-2-pyrrolidones which are highly polar apiotic solvents, are also surface active and can be used. "Surfadone LP-100" from International Specialty Products has been found particularly useful.

Suitable non-ionic surfactants include the polyoxyethylene-polyoxypropylene condensates, which are sold by BASF under the tradename "Pluronic", polyoxyethylene condensates of alkyl phenols; polyoxyethylene condensates of aliphatic alcohols/ethylene oxide condensates having from 1 to 30 moles of ethylene oxide per mole of coconut alcohol; ethoxylated long chain alcohols sold by Shell Chemical Co. under the tradename "Neodol", polyoxyethylene condensates of sorbitan fatty acids, alkanolamides, such as the monoalkoanolamides, dialkanolamides and the ethoxylated alkanolamides, for example coconut monoethanolamide, lauric isopropanolamide and lauric diethanolamide; and amine oxides for example dodecyldimethylamine oxide.

The surfactant of the present invention can be incorporated into the water soluble blast media in a variety of ways. If solid, the surfactant can be mixed as is with the abrasive blast media particles. This is preferred and it has been found that the most useful surfactants for reducing residue formation are anionic surfactants which are mostly solid materials.

If the surfactant is liquid, the surfactant can be sprayed directly onto the blast media particles. While this method is the most direct way of incorporating the surfactant, the flow of the blast media through the metering means which meters the amount of abrasive particles into the fluid carrier stream may be adversely affected by incorporating the surfactant in this manner. Thus, the very fine particles of blast media may agglomerate and otherwise cake or bride together and render particle flow through a metering device difficult. Alternatively, the liquid surfactant can be sprayed onto the blast media particles, the coated blast media particles compacted and the compacted product which is formed regranulated into a surfactant-containing solid. Compacting may be performed by applying pressure to the surfactant-coated abrasive particles such as by continuously admitting the coated abrasive particles to a zone where the coated particles are subjected to pressure between two rolls running oppositely with respect to each other. A preferred means of compacting is by a roller compactor, wherein the particles are subjected to pressure between two rolls under an adjustable compacting pressure. An especially preferred compactor is the Fitzpatrick Co. "Chilsonater" roll compactor. The gap between the rolls, the amount of raw materials introduced to such a roll compactor and the compacting pressure can be adjusted to produce cohesive sheets or pellets of desired density and hardness. The sheets or pellets are then regranulated by any suitable granulating or crushing means. Preferably, the compacted sheets, pellets and the like are fed through a sieve crusher to force the compacted material through a sieve with meshes of a given size determining the particle size of the final product. Screening, if desired, can be performed by any suitable screening device.

Still further, the surfactant can be sprayed directly onto the abrasive blast media particles and the surfactant-coated particles then dusted with a very finely divided material to reduce the caking and bridging between the abrasive particles. Thus, finely divided fume silica, silicates such as clays, talc, mica, diatomaceous earth and metal silicates such as aluminosilicates including zeolites may be used for dusting the liquid surfactant-coated abrasive. Obviously, the addition of a significant amount of water insoluble additives reduces the advantages of the water solubility of the abrasive blast media with respect to disposal. Thus, the amount of dusting agent should be minimized. Inasmuch as the amount of surfactant to be included is minute, likewise the amount of the dusting agent required to maintain free-flow of the blast media should also be minimal.

Still another method of incorporating the surfactant in the blast media is to apply the surfactant to solid carrier particles similar to those described above. Thus, fume silica, various silicates can be utilized as the carrier particles including clays such as kaolin clay, talc, mica, aluminosilicates such as zeolites, as well as water insoluble carbonates, sulfates, etc. Again, the amount of water insoluble materials should be minimized so as to not adversely affect the advantages of the water soluble blast media.

Further, the surfactant can be added to any flow aids which are normally contained in blast media compositions by coating such materials prior to incorporation thereof with the abrasive particles. Such flow aids reduce caking of the water soluble blast media and can include the carrier materials described above. Most preferably, the flow aid is a hydrophilic or hydrophobic silica, hydrophobic polysiloxane or mixture of such materials. These flow aids are typically added in amounts of 0.05 to 20%, preferably about 0.1 to 0.5% by weight relative to the total of abrasive particles. In fact, it has been found that the residues from the water soluble media which are formed are somewhat increased when the blast media composition contains a flow aid. Hydrophobic silica, unlike known hydrophilic silicas, is substantially free of non-hydrogen bonded silanol group and absorbed water. One preferred hydrophobic silica which may be utilized in the blasting media hereof is Aerosil R 972, a product which is available from DeGussa AG. This material is a pure coagulated silicon dioxide aerosol, in which about 75% of the silanol groups on the surface thereof are chemically reacted with dimethyldichlorosilane, the resulting product having about 0.7 mmol of chemically combined methyl groups per 100 $m^2$ of surface area and containing about 1% carbon. Its particles vary in diameter from about 10 to 40 nanometers and have a specific surface area of about 110 $m^2$/gram. It may be prepared by flame hydrolysis of a hydrophilic silica as more fully described in Angew. Chem., 72, 744 (1960); F-pS 1,368,765; and DT-AS 1,163, 784. Further details respecting such material are contained in the technical bulletin entitled "Basic Characteristics and Applications of AEROSIL", DeGussa A. G., August 1986. The hydrophobic silica particles are admixed with the abrasive blasting media in the proportion of at least about 0.1 and up to about 1.0% by weight thereof. Another hydrophobic silica is Quso, marketed by DeGussa A. G.

Hydrophobic polysiloxanes, preferably non-halogenated polysiloxanes, suitable for use in the blasting media hereof are commercially marketed by Dow Corning and General Electric.

An alternative to adding the surfactant to any of the solid materials which form the blast media is to add the surfactant to the water which is utilized as the primary fluid carrier medium or as a dust control agent. Thus, the surfactant can be added at the supply of water or can be added to the water stream at the blast nozzle. By incorporating the surfactant into the water stream, the disadvantages of adding additional water insoluble materials to the blast media is avoided and so is the agglomerating and caking, bridging and restriction to flow of the blast media avoided. Regardless of the method by which the surfactant is added to the blast media, it has been found that the amount of residues which remain on the target surface subsequent to blasting are drastically reduced upon the addition of the surfactant and any residues which do remain can be easily washed off with fresh water.

The amount of surfactant needed to provide reduced residue content and easily rinsed residues is extremely small in most cases and, thus, will range from about finite levels to about 3 wt. %, preferably about 0.05 to about 1 wt. %, and, more preferably, from about 0.05 to 0.5 wt. % of the abrasive blast media particles. As stated above, it has further been found that the addition of the surfactant can actually aid in removing any dirt, grease or oil from the substrate. Nonionic surfactants appear to best provide the additional detersive action. Thus, it may be possible to provide several kinds of surfactants with the blast media including those most readily able to reduce residue formation such as anionic surfactants and those capable of enhancing the removal of dirt, grease or oil from the substrate. The surfactant advantageously solubilizes the dirt and grease allowing easier clean up and reduces the deflection of dirt from one surface to another.

The blast media of the present invention as constituted from the water soluble abrasive particles and surfactant as described above are useful for efficient cleaning or decoating of sensitive metals such as aluminum or aluminum alloys, magnesium, or composite substrates, such as utilized on exterior aircraft surfaces, masonry, stucco, plaster, wood or plastics. Hard steel surfaces can also be cleaned. Such blast media are preferably applied in commercial pressurized water and, more preferably, compressed air streams which contain water either added at the blast nozzle or externally therefrom so as to control dust formation. Blasting equipment for the blast media of the present invention are commercially available. The blast media of flow rates through the blast nozzle typically range from about 0.5 to 15, desirably from about 1.0 to 10.0 lbs per minute and under air pressures from 10 to 100 psi and water pressures for dust control typically ranging from about 10 psi and above.

As indicated above and as more fully documented below, in accordance with the present invention, it has been found that the blast media of the present invention do not leave a substantial amount of residue on the targeted surface and that any residue which remains can be easily removed by the application of fresh water. Thus, the blast media of the present invention can be readily employed in commercial blasting operations for removing coatings from relatively soft surfaces.

The following examples are for the purpose of illustrating the invention and are not to be construed as strictly limiting the invention to only the illustrated embodiments.

EXAMPLE 1

Aqueous saturated solutions each containing a 15 wt. % of a blast media composition were prepared. The compositions are set forth in Table 1. Compositions A and G represent controls. Glass micro slides were submerged in the saturated solutions for two minutes. The slides were then rinsed with fresh water using a wash bottle for 10 seconds. The rinsed slides were dried at ambient conditions overnight. The amount of film on the slides was observed under light and quantified by naked eye. Results are shown in Table 1.

It can be seen that the surfactants tested greatly reduced the residues formed by the control compositions. Anionic, amphoteric and nonionic surfactants were effective in reducing the residues on the glass surface.

TABLE 1

| Compositions (wt. %) | Blast Media | | | | | | |
|---|---|---|---|---|---|---|---|
|  | A | B | C | D | E | F | G |
| Sodium Bicarbonate | 99.75 | 99.70 | 99.65 | 99.65 | 99.65 | 99.65 | 100.0 |
| Sylox ® 15[1] | 0.25 | 0.25 | 0.25 | 0.25 | 0.25 | 0.25 | — |
| Hamposyl ® L-95 | — | 0.05 | — | — | — | — | — |
| Surfadone ® LP-100 | — | — | 0.20 | — | — | — | — |
| Poly-Tergent ® CS-1 | — | — | — | 0.10 | — | — | — |
| Neodol ® 91-6 | — | — | — | — | 0.10 | — | — |
| Neodol ® 25-12 | — | — | — | — | — | 0.10 | — |
| Amount on film observed on rinsed glass slide | Heavy | None–V.Sl.[2] | None–V.Sl. | None–V.Sl. | Sl. | Sl. | Mod.–Heavy |

[1]Hydrophilic silica flow aid
[2]V.Sl. = Very slight

EXAMPLE 2

Clear safety glass panels (15 in.×15 in.) were blasted with various blast media using the Accustrip™ System at the following operating conditions: 60 psi blast air pressure, 4 lbs/min. media flow rate, and 0.5 gpm water flow rate. The glass slides were then rinsed with fresh water for 30 seconds. The rinsed panels were dried overnight. The amount of film of the glass panels was observed as in Example 1. Blast media compositions and results of testing are set forth in Table 2.

TABLE 2

| Compositions (%) | Blast Media | | |
|---|---|---|---|
|  | A | B | C |
| Sodium Bicarbonate | 99.75 | 99.50 | 100.0 |
| Sylox ® 15 | 0.25 | 0.25 | — |
| Hamposyl ® L-95 | — | 0.25 | — |
| Amount of film observed on rinsed glass slide | Heavy | V. slight | Moderate |

What is claimed is:

1. A particulate blast media for stripping contaminants from a solid surface consisting essentially of water soluble abrasive particles having an average size of from about 50 to 1000 microns in diameter and 0.05 to 3 wt. % relative to the amount of said abrasive particles of a surfactant, wherein the amount of abrasive particles above 1,000 microns does not exceed about 1% of the abrasive particles.

2. The blast media of claim 1 wherein said water soluble abrasive particles are sodium bicarbonate.

3. The blast media of claim 1 wherein said surfactant is a solid.

4. The blast media of claim 1 wherein said surfactant is a liquid.

5. The blast media of claim 1 wherein said surfactant is an anionic surfactant.

6. The blast media of claim 5 wherein said surfactant is a solid.

7. The blast media of claim 5 wherein said surfactant is selected from the group consisting of sodium, potassium and ethanol amine salts of N-lauroyl, N-myristoyl or N-palmitoyl sarcosinate.

8. The blast media of claim 4 wherein said liquid surfactant is coated onto said abrasive particles.

9. The blast media of claim 4 further including a carrier particle and wherein said liquid surfactant is coated onto said carrier particles.

10. The blast media of claim 1 further including a flow aid.

11. The blast media of claim 10 wherein said flow aid is selected from the group consisting of hydrophilic silica, hydrophobic silica, hydrophobic polysiloxane and mixtures thereof.

12. The blast media of claim 1 wherein said surfactant is nonionic.

13. The blast media of claim 1 wherein said surfactant comprises a mixture of different surfactants.

14. The blast media of claim 13 wherein said mixture comprises a mixture of an anionic surfactant and a nonionic surfactant.

15. The blast media of claim 1 wherein said surfactant comprises N-alkyl-2-pyrrolidones.

16. The blast media of claim 1 wherein said surfactant comprises polycarboxylated ethylene oxide condensates of fatty alcohols.

17. The blast media of claim 1 wherein said surfactant is an ethoxylated long chain alcohol.

18. The blast media of claim 2 wherein said surfactant is an ethoxylated long chain alcohol.

19. A particulate blast media for stripping contaminants from a solid surface consisting essentially of water soluble abrasive particles having an average size of from about 50 to 1,000 microns in diameter and an anionic surfactant, wherein the amount of abrasive particles above 1,000 microns does not exceed about 1% of the abrasive particles.

20. The blast media of claim 19 wherein said anionic surfactant is a solid.

21. The blast media of claim 19 wherein said anionic surfactant is selected from the group consisting of sodium, potassium and ethanol amine salts of N-lauroyl, N-myristoyl or N-palmitoyl sarcosinate.

22. A particulate blast media for stripping contaminants from a solid surface consisting essentially of water soluble abrasive particles having an average size of from about 50 to 1,000 microns in diameter and a mixture of an anionic surfactant and a nonionic surfactant, wherein the amount of said abrasive particles above 1,000 microns does not exceed about 1% of the abrasive particles.

* * * * *